US011874191B2

United States Patent
Heim et al.

(10) Patent No.: US 11,874,191 B2
(45) Date of Patent: Jan. 16, 2024

(54) STRAIN WAVE GEAR AND TRANSMISSION ELEMENT FOR SAME, ROBOTIC ARM AND METHOD FOR MEASURING A TORQUE

(71) Applicant: Schaeffler Technologies AG & Co. KG, Herzogenaurach (DE)

(72) Inventors: Jens Heim, Bergrheinfeld (DE); Jochen Damerau, Tokyo (JP); Masato Izumi, Tokyo (JP)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 305 days.

(21) Appl. No.: 17/283,766

(22) PCT Filed: Sep. 24, 2019

(86) PCT No.: PCT/DE2019/100837
§ 371 (c)(1),
(2) Date: Apr. 8, 2021

(87) PCT Pub. No.: WO2020/074040
PCT Pub. Date: Apr. 16, 2020

(65) Prior Publication Data
US 2021/0354291 A1  Nov. 18, 2021

(30) Foreign Application Priority Data
Oct. 10, 2018 (DE) .................. 10 2018 125 079.7

(51) Int. Cl.
*F16H 49/00* (2006.01)
*G01L 3/14* (2006.01)

(52) U.S. Cl.
CPC .......... *G01L 3/1457* (2013.01); *F16H 49/001* (2013.01); *F16H 2049/003* (2013.01)

(58) Field of Classification Search
CPC .................................................... F16H 49/001
(Continued)

(56) References Cited

U.S. PATENT DOCUMENTS

| 4,937,759 A | * | 6/1990 | Vold | G05B 19/4061 |
| | | | | 700/262 |
| 5,155,423 A | * | 10/1992 | Karlen | B25J 9/046 |
| | | | | 318/568.1 |

(Continued)

FOREIGN PATENT DOCUMENTS

| CN | 105698992 A | 6/2016 |
| CN | 207556719 U | 6/2019 |

(Continued)

OTHER PUBLICATIONS

Hashimoto, M. et al., "A joint torque sensing technique for robots with harmonic drives" in Proceedings of IEEE International Conference on Robotics and Automation, Issue 2, pp. 1034-1039, Apr. 1991.

(Continued)

*Primary Examiner* — Ha Dinh Ho

(57) ABSTRACT

An elastic transmission element is part of a strain wave gear. Such strain wave gears are also referred to as Harmonic Drives. The elastic transmission element is also referred to as a flexspline and has an outer toothing (03). The elastic transmission element is equipped with at least one strain gauge (04) for measuring a mechanical strain on the elastic transmission element. The one strain gauge (04) or the plurality of strain gauges (04) extends at least as a whole about a circumference of a lateral surface or an axial lateral face of the elastic transmission element.

20 Claims, 3 Drawing Sheets

(58) Field of Classification Search
USPC .......................................................... 74/640
See application file for complete search history.

(56) References Cited

U.S. PATENT DOCUMENTS

| | | | |
|---|---|---|---|
| 6,012,347 A * | 1/2000 | Hasegawa | B62D 6/10 |
| | | | 180/443 |
| 6,472,656 B2 * | 10/2002 | Arai | G01L 3/12 |
| | | | 356/152.3 |
| 6,840,118 B2 | 1/2005 | Godler et al. | |
| 2004/0079174 A1 | 4/2004 | Horiuchi | |
| 2018/0172080 A1 | 6/2018 | Jackowski et al. | |

FOREIGN PATENT DOCUMENTS

| | | |
|---|---|---|
| DE | 102004041394 A1 | 4/2005 |
| DE | 102010011338 A1 | 9/2011 |
| JP | H06185580 A | 7/1994 |
| JP | 2000320622 A | 11/2000 |
| JP | 2004198400 A | 7/2004 |
| JP | 3575719 B2 | 10/2004 |
| JP | 2005069402 A | 3/2005 |
| JP | 2007154955 A | 6/2007 |
| JP | 4518467 B2 | 8/2010 |
| JP | 2016045055 A | 4/2016 |
| JP | 6320885 B2 | 5/2018 |
| RU | 2615719 C1 | 4/2017 |
| WO | 2010142318 A1 | 12/2010 |

OTHER PUBLICATIONS

Taghirad, Hamid D. et al., "Intelligent built-in torque sensor for harmonic drive systems" in Proceedings of IEEE Instrumentation and Measurement Technology Conference Sensing, Processing, Networking, May 1997.

Aghirad, Hamid D., "Robust torque control of harmonic drive systems", Department of Electrical Engineering, McGill University, Montreal, 1997.

Author: Taghirad et al Source: Taghirad et al, "Intelligent Built-In Torque Sensor for Harmonic Drive Systems", IEEE Transactions on Instrumentation and Measurement Date: Dec. 8, 1999 Country: United States.

Source: Hashimoto et al. A Torque Sensing Technique for Robots with Harmonic Drives, IEEE Transactions on Robobtics and Automation Date: Feb. 1, 1993 Country: United States.

* cited by examiner

STRAIN WAVE GEAR AND TRANSMISSION ELEMENT FOR SAME, ROBOTIC ARM AND METHOD FOR MEASURING A TORQUE

CROSS-REFERENCE TO RELATED APPLICATIONS

This application is the U.S. National Phase of PCT Appln. No. PCT/DE2019/100837 filed Sep. 24, 2019, which claims priority to DE 10 2018 125 079.7 filed Oct. 10, 2018, the entire disclosures of which are incorporated by reference herein.

TECHNICAL FIELD

The disclosure relates to an elastic transmission element of a strain wave gear. Such strain wave gears are also referred to as Harmonic Drives or harmonic gearing. The elastic transmission element is also referred to as a flexspline and has an outer toothing. The elastic transmission element also has at least one strain gauge for measuring a mechanical strain of the elastic transmission element. The disclosure also relates to a strain wave gear and a robotic arm, as well as a method for measuring a torque on the elastic transmission element.

BACKGROUND

The article by Hashimoto, M. et al., "A joint torque sensing technique for robots with harmonic drives" in Proceedings of IEEE International Conference on Robotics and Automation, Issue 2, pages 1034-1039, April 1991, describes a method for measuring a torque in a strain wave gear. Strain gauges which are arranged on an elastic transmission element of the strain wave gear are used for measurement.

The article by Taghirad, Hamid D. et al., "Intelligent built-in torque sensor for harmonic drive systems" in Proceedings of IEEE Instrumentation and Measurement Technology Conference Sensing, Processing, Networking, May 1997, and the dissertation by Taghirad, Hamid D., "Robust torque control of harmonic drive systems", Department of Electrical Engineering, McGill University, Montreal, 1997, show a torque sensor for measuring a torque in a strain wave gear. A Kalman filter is used to eliminate high-frequency measurement signal components.

DE 10 2004 041 394 A1 discloses a wave gear device with a torque detection mechanism which comprises a plurality of strain gauges with resistance wire regions on a flexible outer gearwheel, which are electrically connected via conducting wires.

JP 2000320622 A discloses a wave gear having a torque sensor mechanism, which comprises a strain gauge, on a flexible outer gearwheel, which is electrically connected via conducting wires.

US 2004/0079174 A1 teaches a torque detection apparatus for a wave gear comprising a strain gauge unit which has a strain gauge pattern. The strain gauge pattern comprises arc-shaped detection segments A and B and three terminal portions for external wiring, one of which is formed between the detection segments and the others of which are formed at the opposite ends thereof.

JP 2016-045055 A discloses the use of a Wheatstone bridge with strain gauges on a rotating shaft of a wave gear.

U.S. Pat. No. 6,840,118 B2 discloses a torque-measuring method for measuring a torque transmitted in a wave gear device. In the wave gear device, a flexible, circular outer gearwheel partially meshes with a rigid inner gearwheel. A plurality of strain gauge sets is attached to the surface of the flexible outer gearwheel.

CN 105698992 A relates to a high-precision wave gear having a built-in torque sensor. The torque sensor comprises, inter alia, a Wheatstone half bridge.

RU 2 615 719 C1 teaches a wave gear which is designed to measure a torque.

WO 2010/142318 A1 discloses a device for measuring a torque in a wave gear. The device comprises at least one sensor for measuring forces between an outer ring with inner toothing and a housing.

JP 6320885 B2 describes a torque detection element which comprises a plurality of strain gauges that form a Wheatstone bridge. The strain gauges are arranged in the form of a pattern-like metallic film on a surface of a flexible film-like insulation.

The solutions known from the prior art for measuring a torque in a strain wave gear lead to a torque signal which is dependent on and disrupted by the rotational position of the wave generator. The wave generator rotating in relation to the elastic transmission element partially expands the elastic transmission element and thus superimposes the shear strains caused by the torque.

SUMMARY

It is desirable to enable measurement of a mechanical strain in a strain wave gear which is independent of the rotational position of the wave generator. This is achieved by an elastic transmission element as described herein.

The elastic transmission element forms a torque-transmitting component of a strain wave gear. The strain wave gear can also be referred to as Harmonic Drive or harmonic gearing. The elastic transmission element can also be referred to as a flexspline and is preferably formed by a flanged bushing. The elastic transmission element is preferably designed to derive a torque to be transmitted by the strain wave gear.

The elastic transmission element has an outer toothing which is designed to engage an inner toothing of a rigid outer ring of the strain wave gear. The outer toothing and the inner toothing differ in their number of teeth—the difference being preferably two.

The elastic transmission element is equipped with at least one strain gauge and is used to measure a mechanical strain of the elastic transmission element. The at least one strain gauge is preferably used to measure a torque acting on the elastic transmission element.

The one strain gauge or the plurality of strain gauges extends at least as a whole on a circumference of the elastic transmission element. The circumference can be an axially inner circumference or an axially laterally arranged circumference. The circumference can be arranged on an outer or inner lateral surface or on an axial lateral face of the elastic transmission element. The circumference surrounds at least one radially inner portion of the elastic transmission element. The circumference preferably surrounds at least one radially inner cavity of the hollow elastic transmission element. The one strain gauge or the plurality of strain gauges extends at least as a whole completely about and over this circumference of the elastic transmission element. The one strain gauge or the plurality of strain gauges at least as a whole thus surrounds an axis of the elastic transmission element in which the elastic transmission element transmits a torque. The one strain gauge or the plurality of strain gauges preferably extends at least as a whole along a circle which is arranged concentrically and perpendicular to the axis of the elastic transmission element. Preferably, the one strain gauge or the plurality of strain gauges extends at least as a whole in a manner closed on the circumference of the elastic transmission element, with no more than technically unavoidable gaps remaining between the strain gauges. The strain gauges extending about the circumference of the elastic transmission element preferably have the same axial position.

A particular advantage of the transmission element is that interference excitations caused by a rotating wave generator of the strain wave gear are eliminated by a modified arrangement of the at least one strain gauge that can be implemented with little effort. If these interference excitations are detected over the circumference of the elastic transmission element, then the result is a wave-like profile of the disturbance excitation. These interference excitations are eliminated in that the expansions of the at least one strain gauge are integrated over an entire circumference of the elastic transmission element. This integration can take place circumferentially on a cylindrical region and/or circumferentially on an annular flange region of the elastic transmission element. The individual strain gauges or the plurality of strain gauges as a whole output(s) a signal which corresponds to the integral or mean value of the expansion over the circumference. This signal is then independent of the rotational position of the rotating wave generator and thus free of its interferences.

The at least one strain gauge may form a component of a torque sensor. The torque sensor is used to measure a torque acting on the elastic transmission element. The at least one strain gauge is connected to a measurement signal processing unit of the torque sensor via electrical connections. The measurement signal processing unit preferably comprises measurement signal amplifiers, measurement signal addition units, measurement signal inverters, analog filters, digital filters, AD converters, a microprocessor and data memory.

A plurality of the strain gauges may be arranged on the elastic transmission element and may extend as a whole about the circumference of the elastic transmission element. The plurality of strain gauges as a whole completely surrounds this circumference of the elastic transmission element.

The elastic transmission element preferably comprises a hollow-cylindrical part and an annular or disk-shaped part adjoining it in the axial direction. The hollow-cylindrical part preferably has the shape of a bushing. The outer toothing is formed on the hollow-cylindrical part. The annular part preferably has the shape of a collar or a flange. Therefore, the elastic transmission element has the shape of a flanged bushing. The annular part is used to couple a shaft to the transmission element in order to transmit a torque to the shaft. The hollow-cylindrical part and the annular or disk-shaped part have a common axis.

If the one strain gauge or the plurality of strain gauges is arranged on a circumference on the hollow-cylindrical part of the elastic transmission element comprising the lateral surface, then the one strain gauge or the plurality of strain gauges as a whole preferably has the shape of a cylinder shell. If the one strain gauge or the plurality of strain gauges is arranged on a lateral circumference on the annular or disk-shaped part of the elastic transmission element forming the axial lateral face, then the one strain gauge or the plurality of strain gauges as a whole preferably has the shape of a circular ring.

At least one strain gauge may extend on at least two circumferences of the elastic transmission element. At least two circumferential measurements are therefore possible. A first subset of the plurality of strain gauges may extend about a circumference of the elastic transmission element and a second subset of the plurality of strain gauges may extend about a circumference of the elastic transmission element. The first subset and the second subset of the plurality of strain gauges can each extend on the hollow-cylindrical part or on the annular part of the elastic transmission element, or they can extend together on the hollow-cylindrical part or on the annular part of the elastic transmission element. The first subset and the second subset of the plurality of strain gauges thus each have the shape of a cylinder shell or a circular ring. The shapes of the cylinder shell or of the circular ring are preferably arranged coaxially or concentrically.

In embodiments of the elastic transmission element comprising a plurality of strain gauges extending about the circumference of the elastic transmission element, these strain gauges are preferably evenly distributed about the circumference of the elastic transmission element. As a result, these strain gauges have the same center angle with respect to the axis of the elastic transmission element.

The number of the plurality of strain gauges extending about the circumference of the elastic transmission element is preferably four or a multiple of four. The center angles of the strain gauges are thus 90° or 360°/(4·n).

The plurality of strain gauges extending about the circumference of the elastic transmission element preferably form a Wheatstone bridge. For this purpose, the strain gauges are electrically connected accordingly, wherein the connection can be configured as a full bridge or as a half bridge. The four strain gauges or four of the strain gauges are preferably connected as a Wheatstone bridge.

Alternatively, the number of the plurality of strain gauges extending about the circumference of the elastic transmission element is preferably two or a multiple of two. The two strain gauges or two of the strain gauges are preferably connected as a Wheatstone half bridge.

The strain wave gear has a wave generator which comprises an elliptical disk and preferably a deformable raceway. The elliptical disk is preferably made of steel and preferably forms a drive for the strain wave gear. The strain wave gear also comprises a rigid outer ring having an inner toothing. The outer ring is preferably designed as a hollow cylinder and is also referred to as a circular spline. The strain wave gear also comprises the elastic transmission element. The strain wave gear preferably comprises one of the described, preferred embodiments of the elastic transmission element. In addition, the strain wave gear preferably also has features that are described in connection with the transmission element.

The robotic arm comprises at least one drivable arm element which is coupled via the strain wave gear. The at least one drivable arm element is preferably coupled via one of the described preferred embodiments of the strain wave gear.

The method is used to measure a torque on the elastic transmission element of a strain wave gear. The method is used in particular to measure a torque on an embodiment of the elastic transmission element in which a plurality of the strain gauges extends as a whole about a circumference of the elastic transmission element. A signal is tapped at each of the strain gauges. A linear combination of these signals is formed in order to eliminate interference excitations which are caused by the rotating wave generator of the strain wave gear. This linear combination of the signals is preferably formed by a sum of the signals. The linear combination of the signals is proportional to the torque.

The method may also be designed to determine a rotational position of the wave generator on the basis of the signals from the individual strain gauges. The determined rotational position may be used to correct interferences that arise in particular from component tolerances. In addition, a rotational speed of the wave generator may be determined on the basis of the determined rotational position. This is advantageous because the signals from the strain gauges are dependent on the rotational speed of the wave generator, particularly when the wave generator is rotating at high speed.

BRIEF DESCRIPTION OF THE DRAWINGS

Further details, advantages and developments arise from the following description of embodiments with reference to the drawing. In the figures.

DETAILED DESCRIPTION

Figure 1:
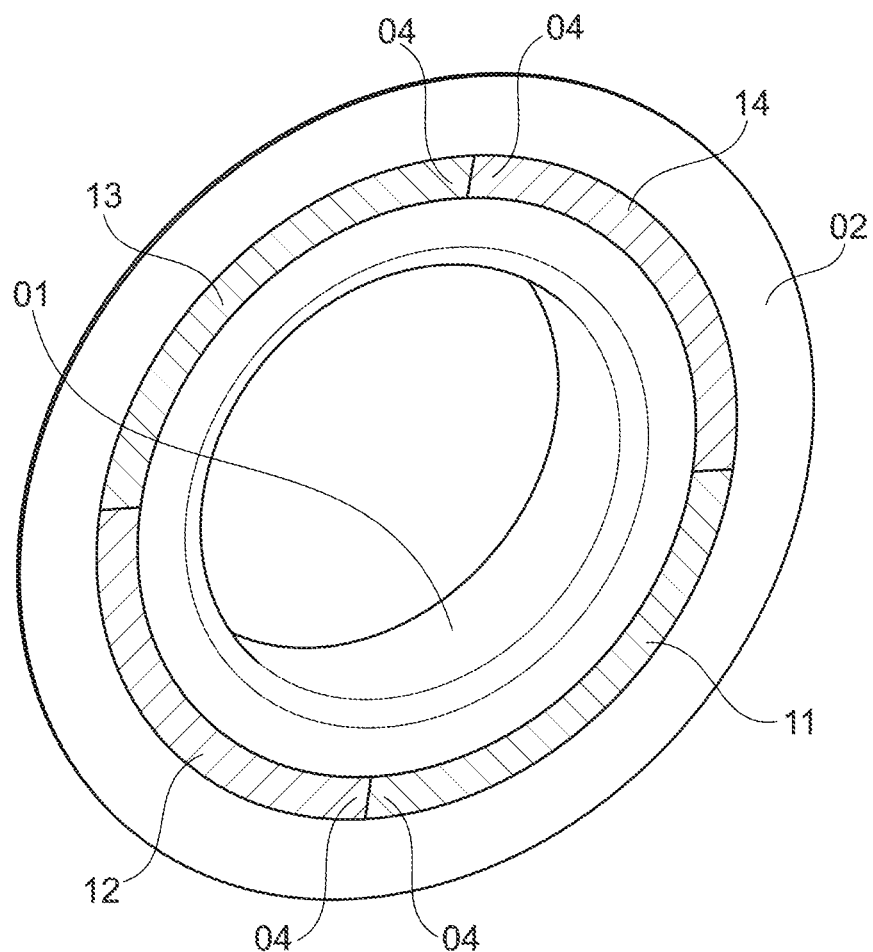
FIG. 1 shows a first embodiment of an elastic transmission element.

FIG. 1 shows a first embodiment of an elastic transmission element of a strain wave gear. The elastic transmission element, which is also referred to as a flexspline, has the shape of a flanged bushing so that it has a bushing-shaped portion 01 and an adjoining annular or flange-like portion 02. An outer toothing 03 (shown in FIG. 6) which engages in an inner toothing (not shown) of an outer ring of the strain wave gear is formed on the bushing-shaped portion 01.

In this first embodiment, four strain gauges 04 are arranged on the annular portion 02 of the elastic transmission element, which together extend completely circumferentially about the elastic transmission element. The four strain gauges 04 form a closed circumference on an axial lateral face of the elastic transmission element. Since the four strain gauges 04 in this first embodiment are arranged laterally on the annular portion 02 of the elastic transmission element, they together have the shape of a circular ring, wherein each of the four strain gauges 04 has the shape of a circular ring segment.

A first strain gauge 11 of the four strain gauges 04, a second strain gauge 12 of the four strain gauges 04, a third strain gauge 13 of the four strain gauges 04 and a fourth strain gauge 14 of the four strain gauges 04 each have a center angle of 90° since the four strain gauges 04 are arranged so as to be circumferentially evenly distributed on the annular portion 02 of the elastic transmission element.

Figures 2, 3:
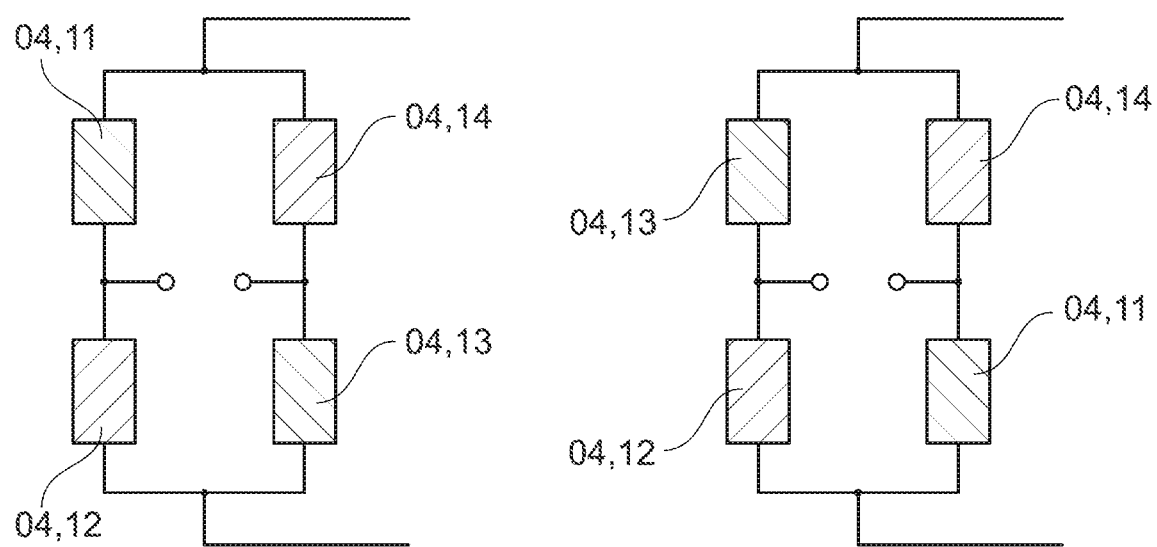
FIG. 2 shows a circuit diagram of a connection of the strain gauges shown in FIG. 1.
FIG. 3 shows a circuit diagram of an alternative connection of the strain gauges shown in FIG. 1.

Possible electrical connections of the four strain gauges 04 are shown in FIGS. 2 and 3.

FIG. 2 shows a circuit diagram of a connection of the strain gauges 04; 11, 12, 13, 14 shown in FIG. 1. The four strain gauges 04; 11, 12, 13, 14 are linearly connected as a Wheatstone bridge, in particular as a full bridge.

FIG. 3 shows a circuit diagram of an alternative connection of the strain gauges 04; 11, 12, 13, 14 shown in FIG. 1. The four strain gauges 04; 11, 12, 13, 14 are cross-connected as a Wheatstone bridge, in particular as a full bridge.

Alternatively, the four strain gauges 04; 11, 12, 13, 14 can be interconnected as a Wheatstone bridge in a half bridge circuit, with the first strain gauge 11 and the second strain gauge 12 forming a first half bridge and the third strain gauge 13 and the fourth strain gauge 14 forming a second half bridge.

Figure 4:
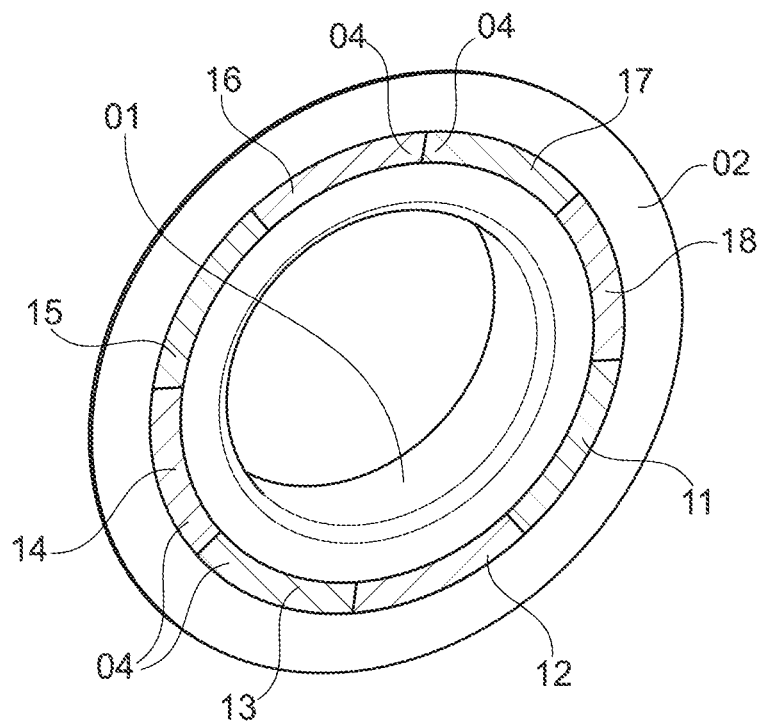
FIG. 4 shows a second embodiment of the elastic transmission element.

FIG. 4 shows a second embodiment of the elastic transmission element. This second embodiment is primarily the same as the first embodiment shown in FIG. 1 and differs therefrom in that it comprises eight instead of four strain gauges 04. The eight strain gauges 04 extend together completely about the circumference of the elastic transmission element.

The eight strain gauges 04, in addition to the first strain gauge 11, the second strain gauge 12, the third strain gauge 13 and the fourth strain gauge 14, comprise a fifth strain gauge 15, a sixth strain gauge 16, a seventh strain gauge 17 and an eighth strain gauge 18.

The eight strain gauges 04; 11, 12, 13, 14, 15, 16, 17, 18 are preferably interconnected as a Wheatstone bridge in a half-bridge circuit, with the first strain gauge 11 and the second strain gauge 12 forming a first half bridge, the third strain gauge 13 and the fourth strain gauge 14 forming a second half bridge, the fifth strain gauge 15 and the sixth strain gauge 16 forming a third half bridge, and the seventh strain gauge 17 and the eighth strain gauge 18 forming a fourth half bridge.

Figure 5:
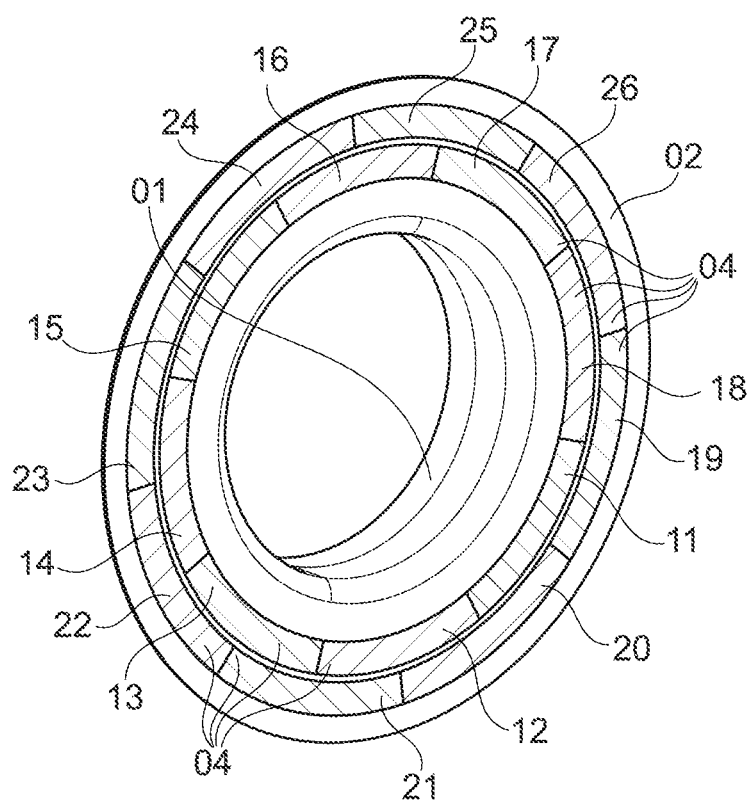
FIG. 5 shows a third embodiment of the elastic transmission element.

FIG. 5 shows a third embodiment of the elastic transmission element. This third embodiment is primarily the same as the second embodiment shown in FIG. 4 and differs from it in that it again comprises eight strain gauges 04. The other eight strain gauges 04 also together extend about the entire circumference of the elastic transmission element and together have the shape of a circular ring which is larger than the circular ring formed by the first eight strain gauges 04; 11, 12, 13, 14, 15, 16, 17, 18, wherein the two circular rings are arranged concentrically and at the same axial position.

The two times eight strain gauges 04, in addition to the first strain gauge 11, the second strain gauge 12, the third strain gauge 13, the fourth strain gauge 14, the fifth strain gauge 15, the sixth strain gauge 16, the seventh strain gauge 17 and the eighth strain gauge 18, comprise a ninth strain gauge 19, a tenth strain gauge 20, an eleventh strain gauge 21, a twelfth strain gauge 22, a thirteenth strain gauge 23, a fourteenth strain gauge 24, a fifteenth strain gauge 25 and a sixteenth strain gauge 26.

The two times eight strain gauges 04 allow redundant measurement.

Figure 6:
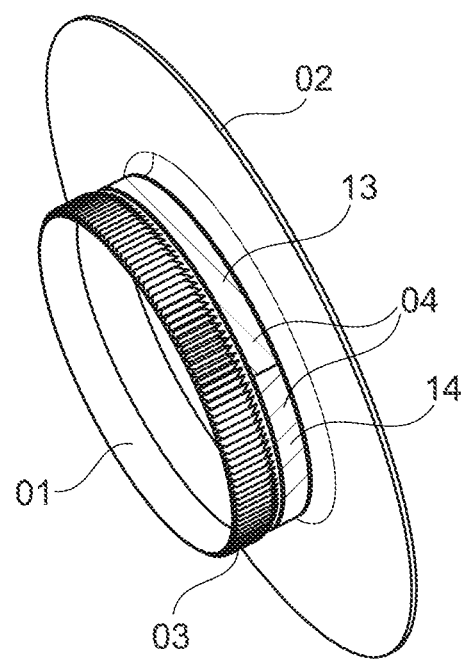
FIG. 6 shows a fourth embodiment of the elastic transmission element.

FIG. 6 shows a fourth embodiment of the elastic transmission element. This fourth embodiment is primarily the same as the first embodiment shown in FIG. 1 and differs from it in that the four strain gauges 04 are arranged on the bushing-shaped portion 01 of the elastic transmission element. Therefore, the four strain gauges 04 together have the shape of a cylinder shell.

Figure 7:
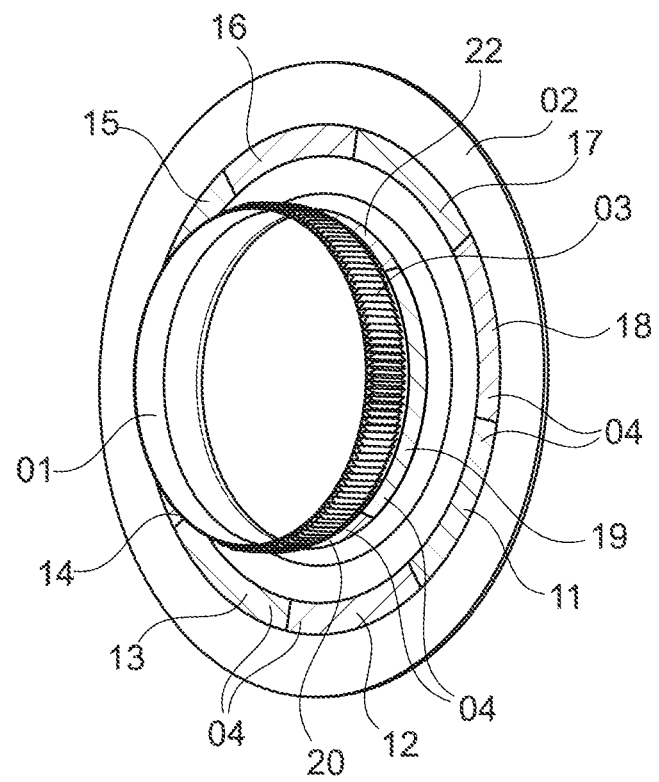
FIG. 7 shows a fifth embodiment of the elastic transmission element.

FIG. 7 shows a fifth embodiment of the elastic transmission element. This fifth preferred embodiment is primarily the same as the second embodiment shown in FIG. 4 and differs from it in that it has four further strain gauges 04; 19, 20, 22 on the bushing-shaped portion 01 of the elastic transmission element like the fourth embodiment shown in FIG. 6. Thus, the fifth embodiment shown comprises, both on the bushing-shaped portion 01 of the elastic transmission element and on the annular portion 02 of the elastic transmission element in each case, strain gauges 04 which together extend completely circumferentially.

LIST OF REFERENCE SIGNS

01 Bushing-shaped portion
02 Annular portion
03 Outer toothing
04 Strain gauge
11 First strain gauge
12 Second strain gauge
13 Third strain gauge
14 Fourth strain gauge
15 Fifth strain gauge
16 Sixth strain gauge
17 Seventh strain gauge
18 Eighth strain gauge
19 Ninth strain gauge
20 Tenth strain gauge
21 Eleventh strain gauge
22 Twelfth strain gauge
23 Thirteenth strain gauge
24 Fourteenth strain gauge
25 Fifteenth strain gauge
26 Sixteenth strain gauge

The invention claimed is:

1. An elastic transmission element of a strain wave gear, comprising:
   a hollow-cylindrical part, and
   an annular part extending radially and adjoining the hollow-cylindrical part in an axial direction,
   wherein an outer toothing is formed on the hollow-cylindrical part,
   wherein a plurality of strain gauges for measuring a mechanical strain of the elastic transmission element are arranged on the elastic transmission element, the plurality of strain gauges including a first subset extending, at least as a whole, about a circumference on a surface of the annular part and a second subset extending, at least as a whole, about the circumference on the surface of the annular part,
   wherein the first subset extends circumferentially around the second subset.

2. The elastic transmission element according to claim 1, wherein the first subset, at least as a whole, has a shape of a circular ring.

3. The elastic transmission element according to claim 1, wherein a number of strain gauges in the plurality of strain gauges is a multiple of four.

4. The elastic transmission element according to claim 3, wherein the strain gauges in at least one of the first subset and the second subset form a Wheatstone bridge.

5. The elastic transmission element according to claim 1, wherein the strain gauges in at least one of the first subset and the second subset form a Wheatstone half bridge.

6. A method for measuring a torque on an elastic transmission element according to claim 1, wherein a linear combination of signals of the plurality of strain gauges is formed.

7. The elastic transmission element according to claim 1, wherein the annular part extends radially outwardly from the hollow-cylindrical part.

8. The elastic transmission element according to claim 1, wherein the second subset, at least as a whole, has a shape of a circular ring.

9. The elastic transmission element according to claim 1, wherein the strain gauges in the first subset are circumferentially offset relative to corresponding strain gauges in the second subset.

10. The elastic transmission element according to claim 1, wherein the surface faces away from the hollow-cylindrical part.

11. A strain wave gear, comprising:
    an elliptical disk;
    a rigid outer ring having an inner toothing; and
    an elastic transmission element, the elastic transmission element including:
      a hollow-cylindrical part, wherein an outer toothing is formed on the hollow-cylindrical part and configured to engage the inner toothing;
      an annular part extending radially and adjoining the hollow-cylindrical part in an axial direction; and
      a plurality of strain gauges including a first subset extending, at least as a whole, about a circumference on a surface of the annular part and a second subset extending, at least as a whole, about the circumference on the surface of the annular part;
      wherein the first subset extends circumferentially around the second subset.

12. The elastic transmission element according to claim 11, wherein the second subset, at least as a whole, has a shape of a circular ring.

13. The elastic transmission element according to claim 11, wherein the strain gauges in the first subset are circumferentially offset relative to corresponding strain gauges in the second subset.

14. A robotic arm having at least one drivable arm element which is coupled via the strain wave gear according to claim 11.

15. An elastic transmission element of a strain wave gear, comprising:
    a hollow-cylindrical part, and
    an annular part extending radially and adjoining the hollow-cylindrical part in an axial direction,
    wherein an outer toothing is formed on the hollow-cylindrical part,
    wherein a plurality of strain gauges for measuring a mechanical strain of the elastic transmission element are arranged on the elastic transmission element, the plurality of strain gauges including a first subset extending, at least as a whole, about a circumference on a surface of the annular part and a second subset extending, at least as a whole, about a circumference on a face of the hollow-cylindrical part,
    wherein the first subset extends circumferentially around the second subset.

16. The elastic transmission element according to claim 15, wherein the second subset, at least as a whole, has a shape of a cylinder shell.

17. The elastic transmission element according to claim 15, wherein the first subset, at least as a whole, has a shape of a circular ring.

18. The elastic transmission element according to claim 15, wherein the annular part extends radially outwardly from the hollow-cylindrical part.

19. The elastic transmission element according to claim 15, wherein the second subset is arranged between the outer toothing and the annular part.

20. The elastic transmission element according to claim 15, wherein the surfaces faces the hollow-cylindrical part.

* * * * *